(12) United States Patent
Neubauer et al.

(10) Patent No.: US 7,971,615 B2
(45) Date of Patent: *Jul. 5, 2011

(54) TIRE WITH TURNED DOWN PLY CONSTRUCTION

(75) Inventors: Robert Anthony Neubauer, Medina, OH (US); Keith Carl Trares, Akron, OH (US); Robert Bernard Nelson, Wadsworth, OH (US); Joseph Kevin Hubbell, Akron, OH (US); Robert Allen Losey, Kent, OH (US); Ping Zhang, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 961 days.

This patent is subject to a terminal disclaimer.

(21) Appl. No.: 11/643,163

(22) Filed: Dec. 21, 2006

(65) Prior Publication Data

US 2007/0131333 A1    Jun. 14, 2007

Related U.S. Application Data

(63) Continuation-in-part of application No. 11/285,249, filed on Nov. 22, 2005, now Pat. No. 7,509,987.

(51) Int. Cl.
*B60C 15/00* (2006.01)
*B60C 15/06* (2006.01)
*B60C 9/00* (2006.01)

(52) U.S. Cl. ........ 152/539; 152/542; 152/546; 152/550; 152/552; 152/555

(58) Field of Classification Search .................. 152/539, 152/542, 546, 550, 552, 555
See application file for complete search history.

(56) References Cited

U.S. PATENT DOCUMENTS

| 2,186,178 A | 1/1940 | Shoemaker | 152/362 |
| 3,058,509 A | 10/1962 | Maiocchi | 152/356 |
| 3,062,258 A | 11/1962 | Maiocchi | 152/356 |
| 3,386,486 A | 6/1968 | Kovac et al. | 152/354 |
| 3,431,963 A | 3/1969 | Sons, Jr. | 152/356 |
| 3,690,363 A | 9/1972 | Guyot | 152/359 |
| 4,150,703 A | 4/1979 | Sons, Jr. | 152/361 R |
| 4,887,655 A | 12/1989 | Imai et al. | 152/531 |

(Continued)

FOREIGN PATENT DOCUMENTS

EP    1433590 A2    6/2004

(Continued)

OTHER PUBLICATIONS

European Search Report, completed Feb. 27, 2007.

*Primary Examiner* — Justin Fischer
(74) *Attorney, Agent, or Firm* — June E. Rickey (57) ABSTRACT

The tire includes a first and second axially-spaced bead core, a carcass having at least one belt extending under a tread, and a first ply layer having first and second ends, a first end is located axially outside and adjacent a first bead core, and a second end that is located axially outside and adjacent a second bead core. The carcass further comprises first and second shoulder ply layers each shoulder ply layer having first and second ends, a first end is located under the tread belt, the shoulder ply extending down the side wall region with the second end folding from a position axially outside a respective bead core to a position axially inside and around the bead core. The carcass further comprises an additional reinforcement layer which wraps around the bead and is preferably positioned between the shoulder ply and the first ply layer, although not required.

7 Claims, 12 Drawing Sheets

U.S. PATENT DOCUMENTS

| | | | |
|---|---|---|---|
| 4,972,893 A | 11/1990 | Komai et al. | 152/557 |
| 5,323,830 A | 6/1994 | Diernaz | 152/544 |
| 5,513,686 A | 5/1996 | Diernaz | 152/540 |
| 5,685,927 A | 11/1997 | Hammond et al. | 152/209 R |
| 5,688,345 A | 11/1997 | Billieres | 152/540 |
| 6,179,028 B1 | 1/2001 | Drieux et al. | 152/456 |
| 6,230,773 B1 | 5/2001 | Sandstrom et al. | 152/517 |
| 6,408,914 B1 | 6/2002 | Lamock et al. | 152/543 |
| 6,626,220 B1 | 9/2003 | Drieux et al. | 152/539 |
| 6,758,252 B2 | 7/2004 | Bordoz et al. | 152/454 |
| 2004/0123928 A1 | 7/2004 | Losey | 152/454 |
| 2004/0123937 A1 | 7/2004 | Losey | 156/132 |

FOREIGN PATENT DOCUMENTS

| | | |
|---|---|---|
| EP | 1433624 A2 | 6/2004 |
| JP | 2-155812 | 6/1990 |
| JP | 10-157408 | 6/1998 |

TIRE WITH TURNED DOWN PLY CONSTRUCTION

RELATED APPLICATIONS

This patent application is a continuation-in-part of and claims priority to U.S. Ser. No. 11/285,249, filed on Nov. 22, 2005, now U.S. Pat. No. 7,509,987 entitled "Tire with Turned Down Ply Construction", which is hereby incorporated by reference in its entirety.

FIELD

This invention relates to pneumatic tires, and more particularly, the invention relates to ply constructions for tires.

BACKGROUND OF THE INVENTION

Figure 1:
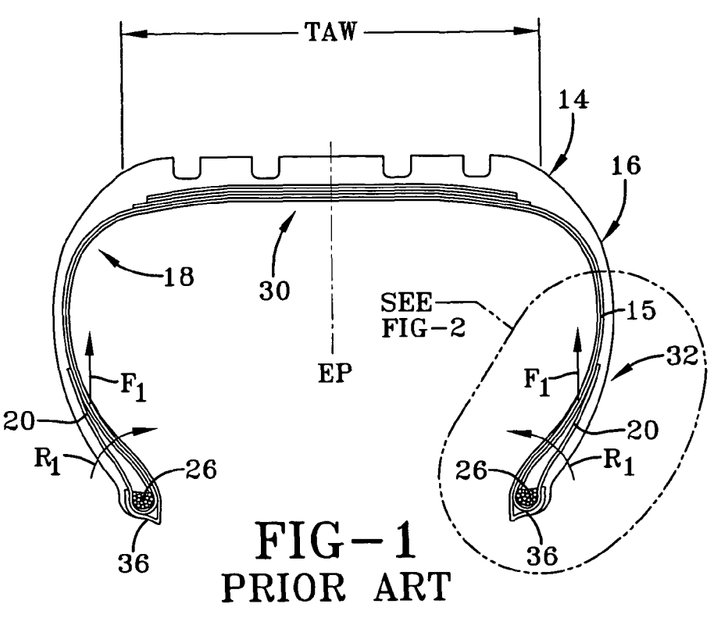
FIG. 1 is a cross-sectional view of the general construction of a prior art tire.
Figure 2:
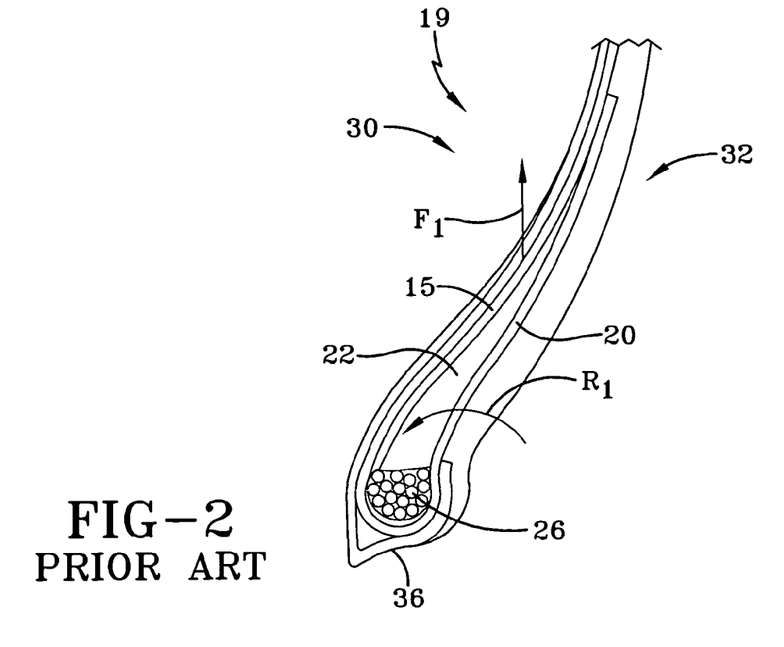
FIG. 2 illustrates an expanded cross-sectional view of the prior art bead region of the tire of FIG. 1.

Modern passenger tires are typically constructed as shown in FIGS. 1 and 2, wherein the turn-up ends 20 of the ply wrap around the bead cores 26 in an inside-out fashion with reference to the interior 30 and exterior 32 of the tire. When the tire is inflated, the radial ply 15 exerts an inherent upward force $F_1$ as shown in FIG. 1. The force $F_1$ exerted by the radial ply 15 causes the bead cores 26 to rotate in a direction $R_1$, causing the toe 36 to lift away from the rim (not shown). This configuration is standard on the vast majority of tire constructions.

It is known in the prior art to utilize an "outside-in" configuration wherein the ply is wrapped around the bead so that the turn up end is located on the inside of the tire or inside the apex. The reversing of the location of the ply turnup results in the reversing of the direction of the force on the ply (not shown), torquing the toe 36 into the rim. Further, this reversed torquing action utilizes the material in the bead more efficiently allowing the bead size to be proportionately reduced. Other associated components can then also be reduced. Even a small decrease in the amount of materials needed to produce a tire can result in significantly decreased material expenses for a manufacturer engaged in high-volume tire production. There is a need for a tire having reduced weight that provides the desired performance characteristics and can be produced with fewer materials at a lower cost.

SUMMARY

The present invention provides a tire utilizing an outside-in ply construction which torques the tire bead into the rim of the wheel to which it is mounted. The tire's outside-in ply construction also serves to pull down the toe of the tire, improving contact between the tire and the rim and to reduce rim indentation. The outside-in ply construction allows the rim to provide greater support for the tire. The reverse pulling direction of the ply reduces toe lifting and facilitates the use of a smaller bead and reduces the tire's weight and material usage.

The invention provides in a first aspect a pneumatic tire comprising a first and second axially-spaced bead core, a carcass having at least one belt extending under a tread, and a first ply layer having first and second ends, a first end is located axially outside and adjacent a first bead core, and a second end that is located axially outside and adjacent a second bead core; the carcass further comprising first and second shoulder ply layers, each shoulder ply layer having first and second ends, a first end is located under the tread belt, the shoulder ply extending down the side wall region with the second end folding from a position axially outside a respective bead core to a position axially inside and around the bead core.

The invention will best be understood with reference to the following description of preferred embodiments taken in conjunction with the accompanying drawings.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Laminate structure" means an unvulcanized structure made of one or more layers of tire or elastomer components such as the innerliner, sidewalls, and optional ply layer.

BRIEF DESCRIPTION OF DRAWINGS

In the accompanying drawings:

FIGS. 6A-6B are cross-sectional views showing the layout of the tire components on a tire building drum of the tire of FIG. 5. FIG. 6A illustrates the components before turn-up of the ply, and FIG. 6B illustrates the tire components after turn-up of the ply.

FIGS. 8A-8B are cross-sectional views showing the layout of the tire components on a tire building drum of the tire of FIG. 7. FIG. 8A illustrates the components before turn-up of the ply, and FIG. 8B illustrates the tire components after turn-up of the ply, respectively.

DESCRIPTION OF THE PREFERRED EMBODIMENT(S)

Figure 3:
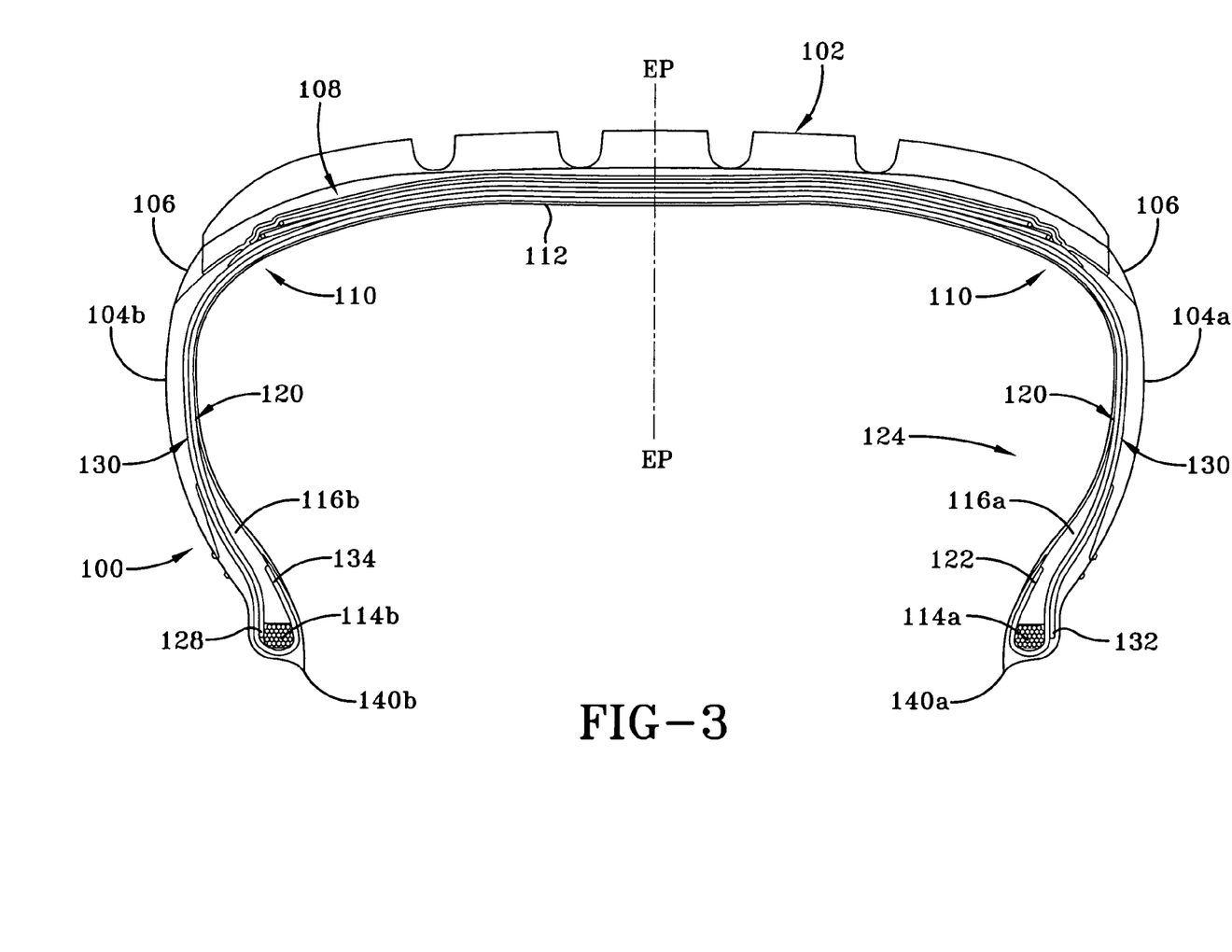
FIG. 3 is a cross-sectional view of the general construction of a tire according to a first embodiment of the present invention.

With particular reference to FIG. 3, there is illustrated a cross-sectional view of a first embodiment of a tire 100 of the present invention. The tire 100 has a tread portion 102 and a pair of sidewalls 104a, b wherein the sidewalls are connected to the tread portion by shoulder regions 106. The tire may have one or more reinforcing belts 108 which laterally extend under the tread 102. A carcass 110 of the tire includes an innerliner 112 which extends from bead 114a to bead 114b. The carcass further comprises a first ply layer 120 and a second ply layer 130. The carcass may comprise additional ply layers if needed. The first ply 120 has a reverse turned up end with the end 122 of the ply located on the interior portion 124 of the tire. The first ply 120 extends down from the turned up end 122, wraps along the outer portion of bead 114a, up the sidewall 104a, under the tread 102, down the sidewall 104b with a second end 128 extending down to bead 114b. The second end 128 does not wrap around bead 114b. The second end 128 is tucked in between bead 114b and second ply layer 130.

A second layer of ply 130 is located radially outward of the first layer of ply 120. The second layer has a first end 132 located adjacent bead 114a and outside of first ply layer 120. The second ply layer 130 does not wrap around bead 114a. The second layer of ply 130 extends upwardly from the bead 114a, under the sidewall 104a, under the tread belts 108, under the opposite shoulder 104b, down and around the outside of bead 114b, and ending in a turned up end 134 located on the interior portion 124 of the tire. Thus each ply layer 120,130 has only one turned up end 122, 134 that wraps around a bead in a reversed direction as compared to conventional tires.

The ply layers 120,130 may be of standard construction, i.e., comprised of a layer of elastomer-coated cords, with the cords typically angled in the range of 72 to about 90 degrees, or any desired orientation. A typical standard layer of ply has a depth or gauge in the range of about 0.04 to about 0.06 inches, typically 0.045 inches, with a cord spacing in the range of about 18 to about 36 epi, typically about 28 epi. The cord diameters of a standard ply layer are typically in the range of about 0.022 to about 0.031. The ply layers 120,130 may also be of reduced thickness and have a reduced cord spacing as described in more detail, below.

Figure 4A:
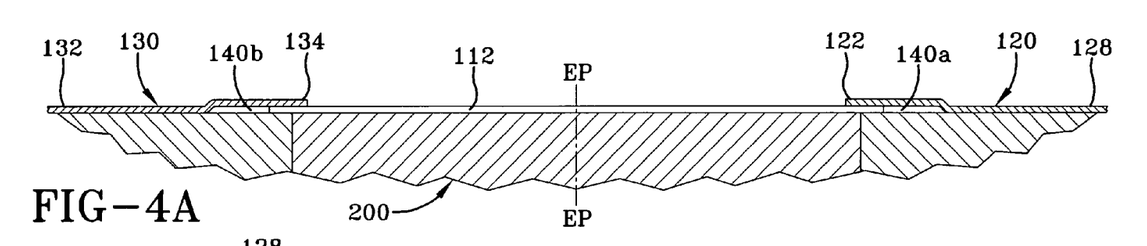
FIGS. 4A-4C are cross-sectional views showing the layout of the tire components on a tire building drum illustrating the components before turn-up of the ply, the right side turn up and the left side turn up respectively.

FIGS. 4A-4C illustrate the assembly of the tire components on a tire building drum of the tire of FIG. 3. As shown in FIG. 4A, first an inner liner 112 is laid up on the midsection of a tire building drum 200. Next, an optional first and second toeguard 140a, 140b is placed on the outer edges of the inner liner 112 at the location where the beads 114a, 114b will be placed. A first layer of ply 120 is applied on the right hand side of the drum so that one end 122 of the first ply layer 120 is located inside of where bead 114a will be placed, while the second end 128 extends laterally outwards therefrom. A first bead 114a and optional apex 116a is set over the toeguard 140a, liner 112 and ply end 122. Then a second layer of ply 130 is applied so that one end 134 of the second ply layer is located inside second bead 114b while the second end 132 extends laterally outwards therefrom. A second bead 114b and optional apex 116b is set over the second toeguard 140b, liner 112 and second layer of ply 130. The beads are preferably locked in place on the tire building drum.

Figure 4B:
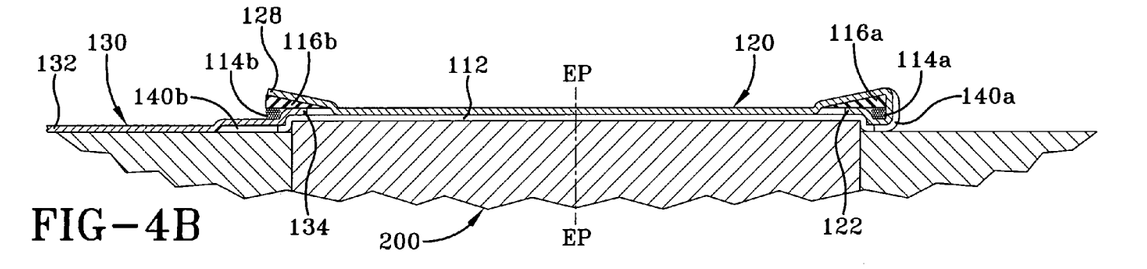
Figure 4C:
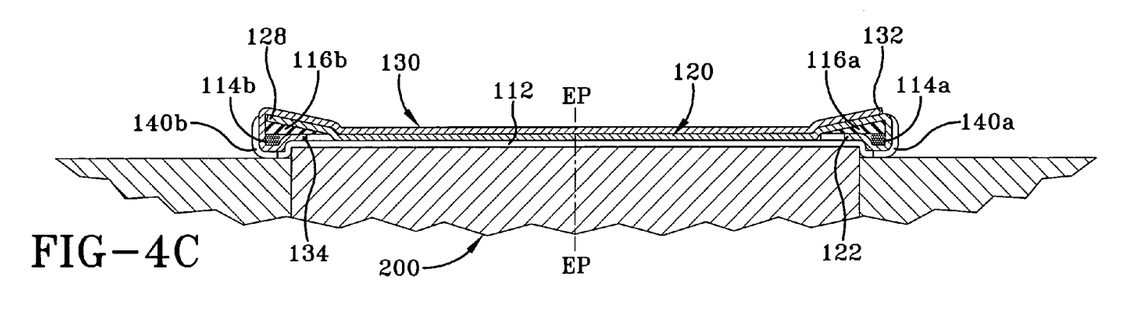

After the tire components have been laid up on the tire building drum, the right hand side tire components may be turned up on the tire building drum using conventional means such as inflatable turn up bladders (not shown). As shown in FIG. 4b, first the right hand side of the tire components are folded over bead 114a and apex 116a so that the first layer of ply is in contact with the innerliner 112, and the outer end 128 of the first layer of ply 120 extends over to the opposite bead 114b. Next the left hand side of the tire components are folded over the bead 114b and apex 116b so that the outer end 132 of the second layer of ply 130 is located over the opposite bead 114a, as shown in FIG. 4c. Alternatively, the turn up order could also be reversed, if desired. Next the components can be stitched so that the inner liner and ply layers can be secured together.

Once all of the tire components are assembled, the carcass assembly 100 can be toroidally shaped by moving the beads and carcass components axially inward as the assembly is expanded radially to a toroidal shape as shown in FIG. 3.

Figure 5:
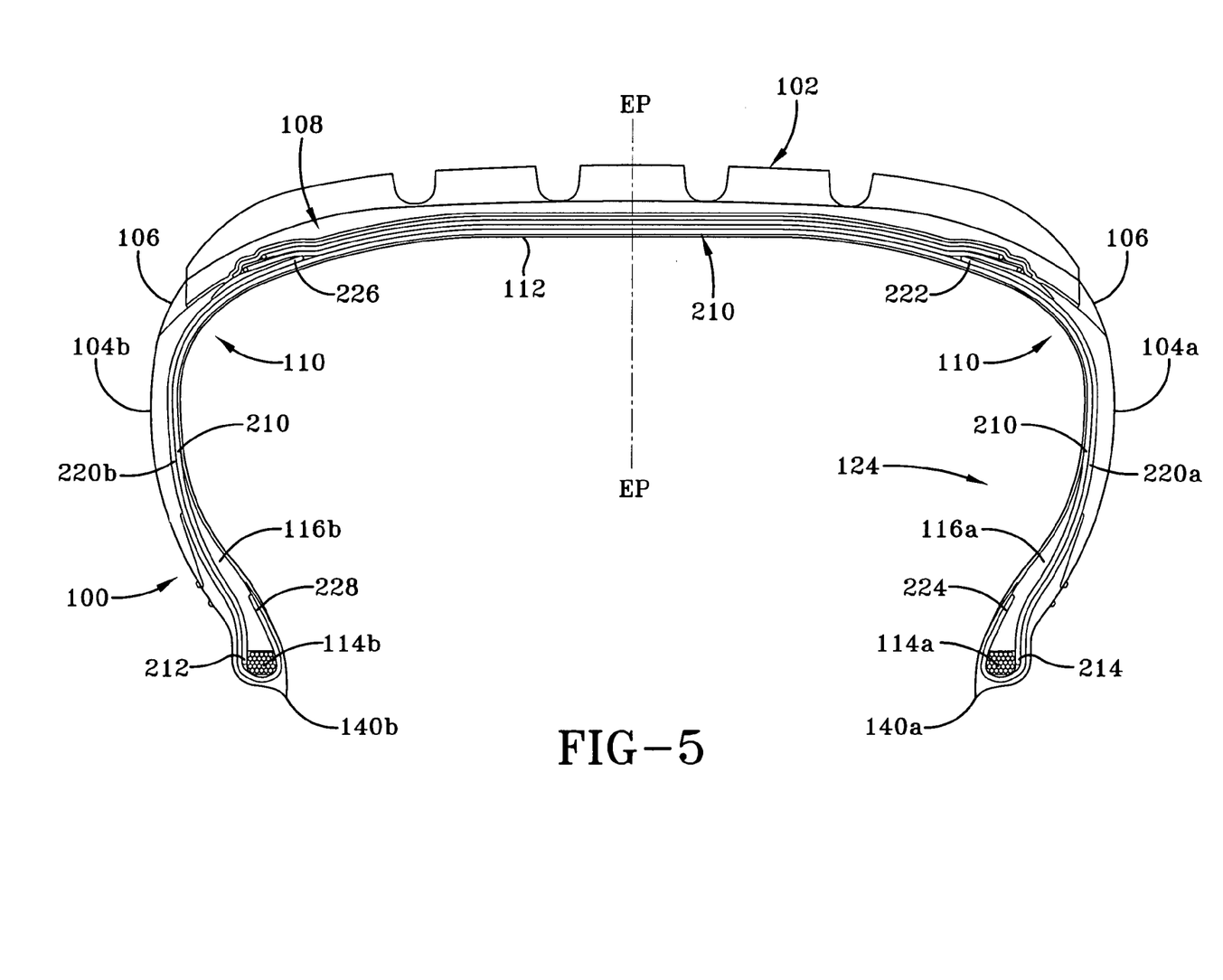
FIG. 5 is a cross-sectional view of the general construction of a tire according to a second embodiment of the present invention.

A cross-sectional view of a second embodiment of a tire assembly 200 is shown in FIG. 5. The tire assembly 200 includes all of the tire components as shown in FIG. 3 and described above, except that a different ply construction is utilized. Instead of ply layers 120,130 as described above, ply layers 210,220 are utilized. Ply layer 210 is located radially outward of the inner liner 112, and has a first end 212 located adjacent bead 114*b*. The ply layer 210 extends up from the first end 212, up the sidewall 104*b*, under the tread 102, down the other sidewall 104*a* and extends down to the other bead 114*a*. The ends 212,214 of ply layer 210 do not wrap around either bead.

A second layer of sidewall ply 220*a, b* is located radially outward of the first layer of ply 210 in the sidewall and shoulder area. A first sidewall ply 220*a* has a first end 222 located under the inner tread belt 108 and extends down the sidewall 104*a*, wraps around the bead 114*a* and optional apex 116*a*, and has a turned up end 224 located on the interior of the tire assembly. A second sidewall ply 220*b* has a first end 226 located under the inner tread belt 108 and extends down the sidewall 104*b*, wraps around the bead 114*b* and optional apex 116*b*, and has a turned up end 228 located on the interior of the tire assembly. Thus the second layer of ply 220 does not extend under the crown portion of the tire.

The first layer and second layer of ply 210,220 may be comprised of conventional ply, having a typical gauge thickness and cord spacing. The ply layers 210,220 may also be of reduced thickness and of reduced cord spacing as described in more detail, below.

Figure 6A:
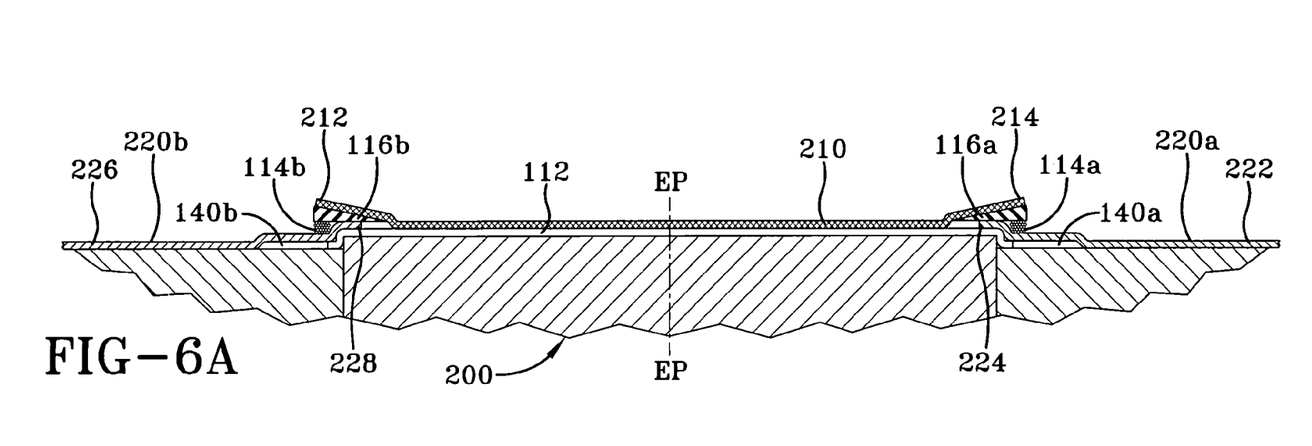

FIGS. 6A and 6B illustrate the layout of the tire components on a tire building drum. As shown in FIG. 6A, first an inner liner 112 is laid up on the midsection of a tire building drum 200. Next, an optional first and second toeguard 140*a*, 140*b* is placed on the outer edges of the inner liner 112 at the location where the beads 114*a*, 114*b* will be placed. A first layer of ply 220*a* is applied on the right hand side of the drum so that one end 224 of the first ply layer 120 is located over the first toeguard 140*a* and liner 112 while the second end 222 extends laterally outwards therefrom. A second layer of ply 220*b* is applied so that one end 228 of the second ply layer is located over a second toeguard 140*b*, and liner 112 while the second end 226 extends laterally outwards therefrom. A second bead 114*b* and optional apex 116*b* is set over the second toeguard 140*b*, liner 112 and second layer of ply 220*b*. The beads are preferably locked in place on the tire building drum. Next, ply layer 210 is laid up on the drum and is positioned over the inner liner 112 and has ends extending from bead 114*a* to bead 114*b*.

Figure 6B:
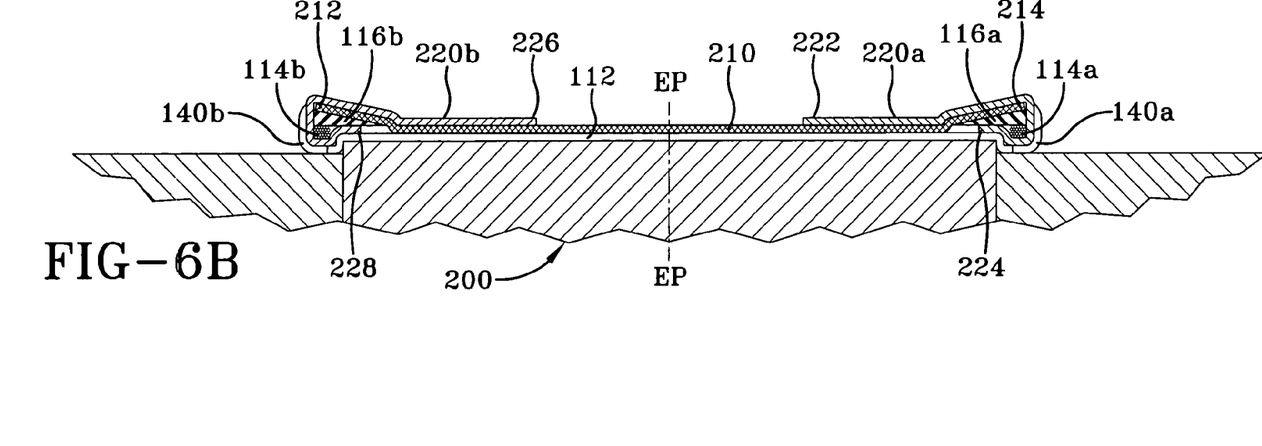

After the tire components have been laid up on the tire building drum, the right hand side and left hand side tire components may be turned up on the tire building drum using conventional means such as turn up bladders (not shown). As shown in FIG. 6*b*, the shoulder plies 220*a*, 220*b* are folded over bead 114*a* and apex 116*a* with the ends 222*a*, *b* folded over into contact with the ply 210. Next the components can be stitched so that the inner liner and ply layers can be secured together. Once all of the tire components are assembled, the carcass assembly 100 can be toroidally shaped by moving the beads and carcass components axially inward as the assembly is expanded radially to a toroidal shape as shown in FIG. 5. In summary, tire assembly thus comprises a bead-to-bead ply layer 210 which extends to, but does not wrap around beads 114*a, b*. The tire assembly further comprises first and second shoulder plies 220*a, b* which are not joined together and are not located in the crown region. Each shoulder ply 220*a* wraps around a respective bead so that the turn up end is located on the interior face of the tire. The first and second shoulder plies 220*a*, 220*b* and the bead-to-bead ply 210 are each preferably comprised of reduced-gauge ply with reduced epi, as described in more detail, below. Thus in the shoulder and apex regions where the ply layers overlap, the layers combine to have the full epi, full gauge of a normal ply layer.

Figure 7:
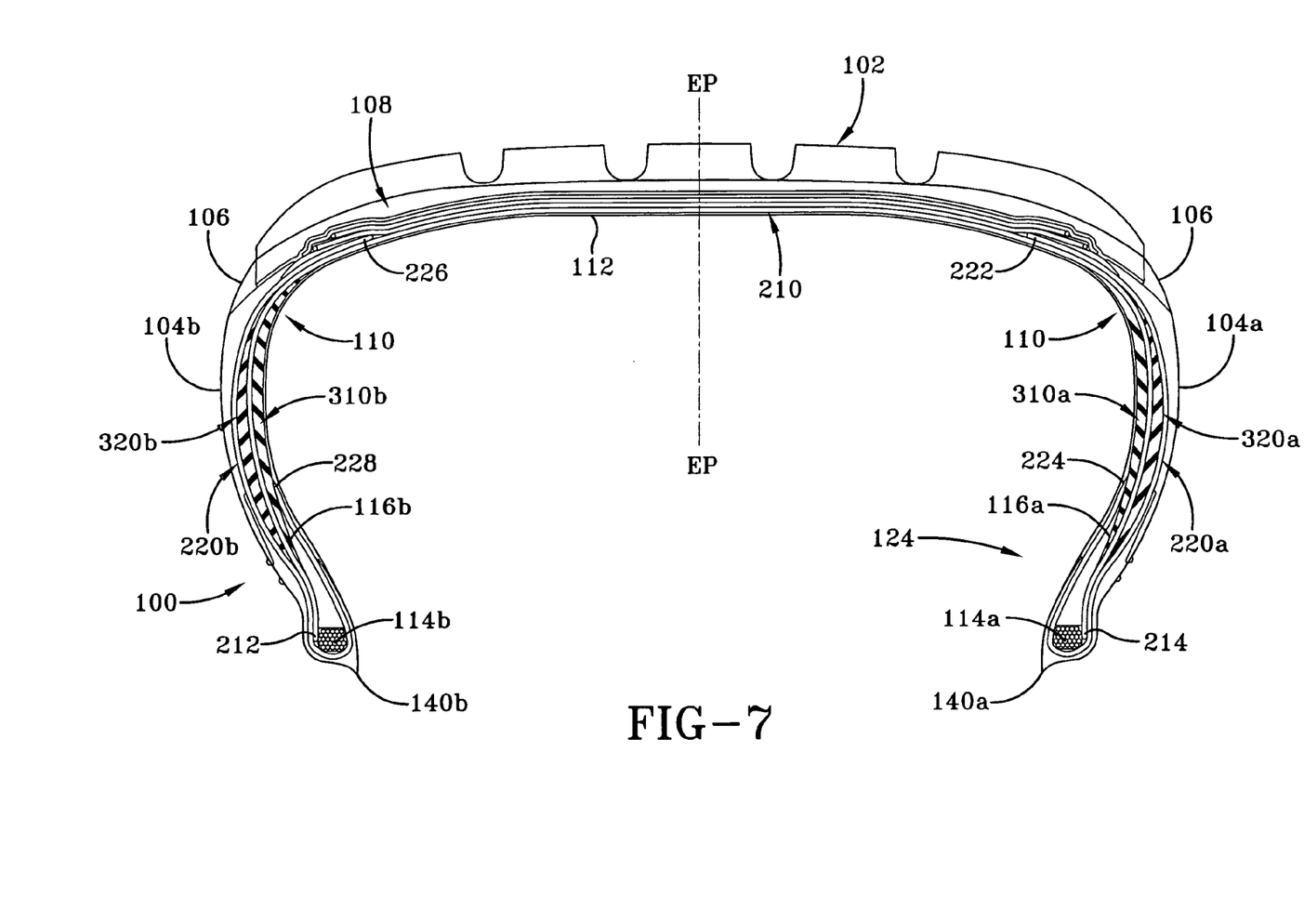
FIG. 7 is a cross-sectional view of another embodiment of a tire in accordance with the invention.

A cross-sectional view of a third embodiment of a tire assembly 300 is shown in FIG. 7. The tire assembly 300 includes all of the tire components as shown in FIG. 5 and described for tire assembly 200 above, except that shoulder inserts are additionally utilized for a run flat or extended mobility tire construction. A first shoulder insert 310*a, b* is located between the liner 112 and the bead to bead ply 210 in the shoulder of the tire assembly 300. The shoulder insert extends from near the top of apex 116 to near the edge of the belts 108 in the shoulder area. An optional second set of shoulder inserts 320*a, b* are located between the bead to bead ply 210 and the shoulder plies 220*a, b*. The second set of shoulder inserts 320*a, b* extend from near the edge of belts 108 to near the apex 116*a, b*.

Figure 8A:
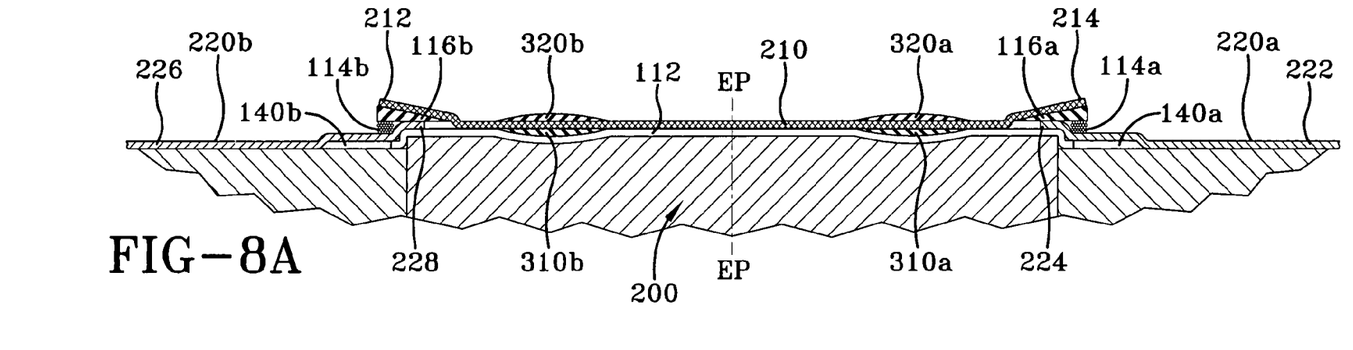

The layout of the tire components is shown in FIGS. 8A and 8B. As shown in FIG. 8A, first an inner liner 112 is laid up on the midsection of a tire building drum 200. Next, a first and second toeguard 140*a*, 140*b* and liner 112 is placed on the outer edges of the inner liner 112 at the location where the beads 114*a*, 114*b* will be placed. A first layer of ply 220*a* is applied on the right hand side of the drum so that one end 224 of the first ply layer 120 is located over the first toeguard 140*a*, and liner 112 while the second end 222 extends laterally outwards therefrom. A second layer of ply 220*b* is applied so that one end 228 of the second ply layer is located over a second toeguard 140*b* while the second end 226 extends laterally outwards therefrom. Next, shoulder inserts 310*a, b* are placed over the ends of the inner liner. A first bead 114*a* and apex 116*a* is set over the toeguard 140*a* and ply end 224. A second bead 114*b* and apex 116*b* is set over the second toeguard 140*b* and second layer of ply 220*b*. The beads are preferably locked in place on the tire building drum. Next, ply layer 210 is laid up on the drum and is positioned over the inner liner 112 and has ends extending from bead 114*a* to bead 114*b*. An optional second set of inserts 320*a, b* is laid over the ply layer 210, axially inward of the beads.

Figure 8B:
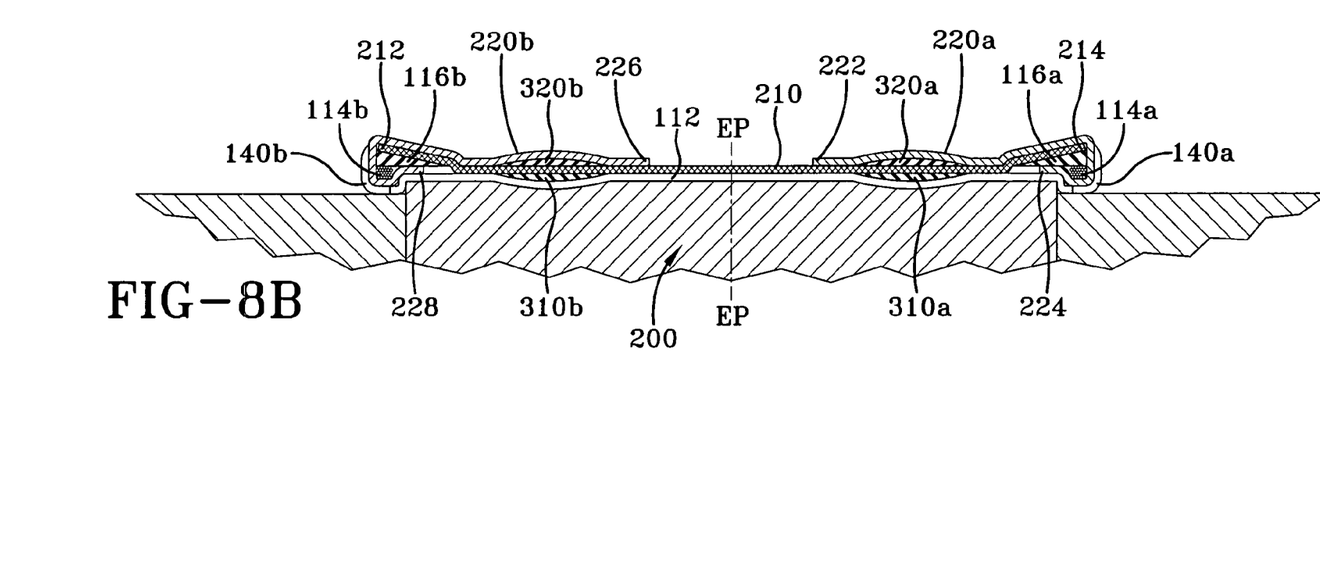

After the tire components have been laid up on the tire building drum, the right hand side and left hand side tire components may be turned up on the tire building drum using conventional means such as turn up bladders (not shown). As shown in FIG. 8*b*, the shoulder plies 220*a*, 220*b* are folded over bead 114*a* and apex 116*a* with the ends 222,226 folded over into contact with the innerliner 112. Next the components can be stitched so that the inner liner and ply layers can be secured together. Once all of the tire components are assembled, the carcass assembly 300 can be toroidally shaped by moving the beads and carcass components axially inward as the assembly is expanded radially to a toroidal shape as shown in FIG. 7. In summary, tire assembly 300 thus comprises a bead-to-bead ply layer 210 which extends to, but does not wrap around beads 114*a, b*. The tire assembly further comprises first and second shoulder plies 220*a, b* which are not joined together and are not located in the crown region. Each shoulder ply 220*a* wraps around a respective bead so that the turn up end is located on the interior face of the tire. The first and second shoulder plies 220*a*, 220*b* and the bead-to-bead ply 210 are each preferably comprised of half-gauge ply with half the desired epi. Thus in the shoulder and apex regions where the ply layers overlap, the layers combine to have the full epi, full gauge of a normal ply layer. The tire assembly further comprises one or more sets of shoulder inserts for use as an extended mobility tire or run flat tire construction.

Figure 14:
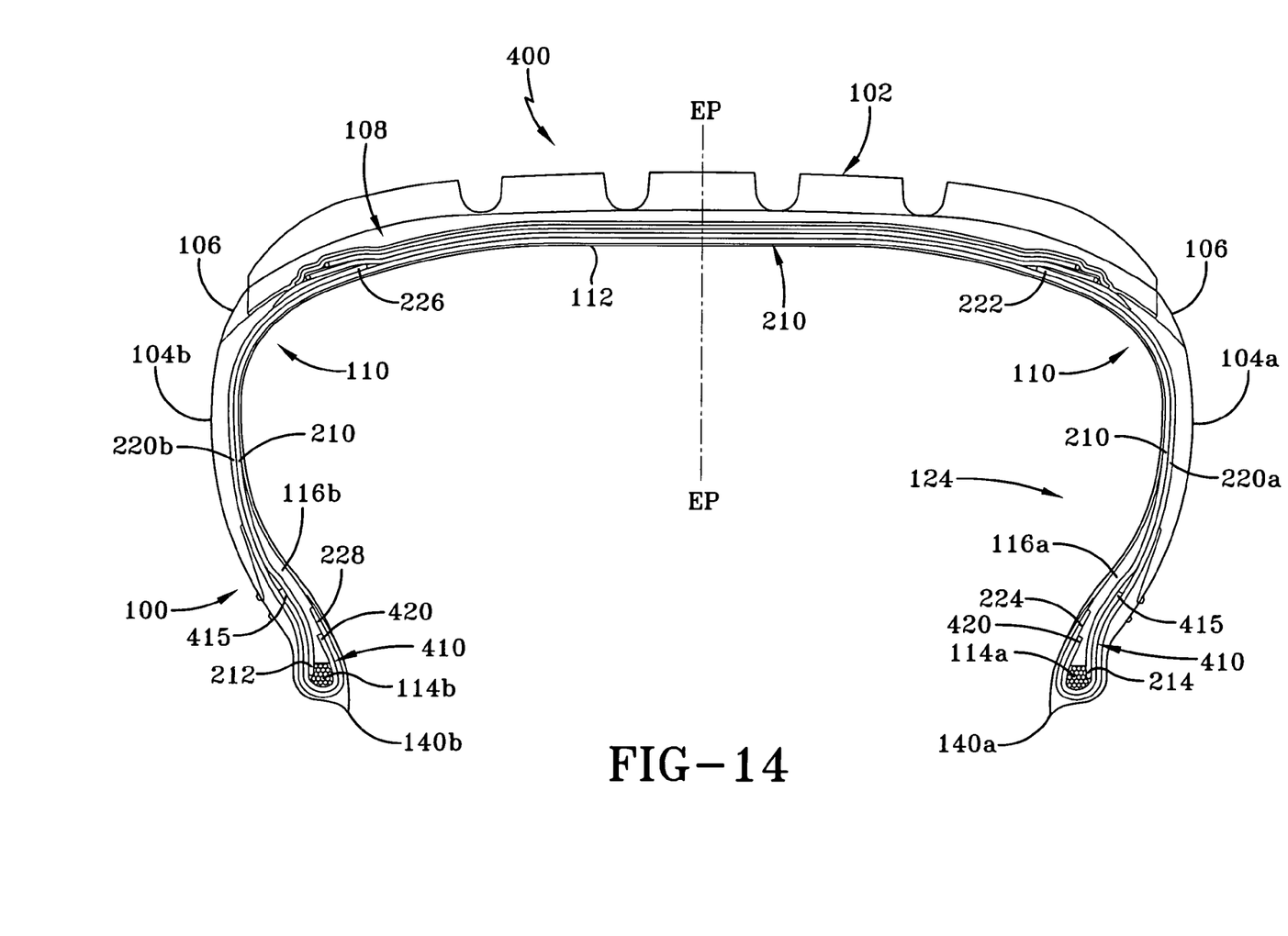
FIG. 14 is a cross-sectional view of the general construction of a tire according to a fourth embodiment of the present invention.

A cross-sectional view of a fourth embodiment of a tire assembly 400 is shown in FIG. 14. The tire assembly 400 includes all of the tire components as shown in FIG. 5 and described for tire assembly 200 above, except an additional reinforcement layer 410 is utilized. The additional reinforcement layer 410 may be located between the bead to bead ply 210 and the shoulder ply 220a, b in the bead area of the tire assembly 400. The additional reinforcement 410 wraps around the bead 114a, b. The additional reinforcement 410 has a first end 415 which is located between ply 210 and shoulder ply 220a, b. The first end 415 extends radially outward of the bead and as shown, does not extend radially outward of the apex. However, the first end may extend radially outward of the apex. The reinforcement 415 extends down and wraps around bead 114. The reinforcement 410 has a second end 420 which extends radially outward of the bead adjacent turnup 224,228 of the shoulder ply 220a, b. Although not shown, the second end 420 may also extend radially outward of the apex 116a, b. Also, the reinforcement second end 420 does not need to radially extend outward as far as turn up end 224,228. The advantage to this construction is that there are two layers of ply which wrap around the bead yet still provide significant weight savings over the standard two ply construction. Further, this construction allows for manufacturing variation of the placement and/or width of the ply cord 210 which does not wrap around the bead.

Alternatively, the reinforcement layer 415 may be located outward of the shoulder ply 220a, b. The reinforcement layer 415 is preferably ply but could be some other material besides ply. If tire ply is used, the angle need not be 90 degrees, and can be some angles less than 90 degrees.

Ply Configurations

Any or all of the ply layers 120,130,210,220,410,415 in a tire may also be comprised of a reduced gauge ply having a reduced thickness on the order of about 30% to about 100% of the gauge thickness of a standard layer of ply. A standard layer of ply is defined herein as having a depth or gauge in the range of about 0.04 to about 0.06 inches, typically 0.045 inches, with a cord spacing in the range of about 18 to about 36 epi, typically about 28 epi, and with cord diameters in the range of about 0.022 to about 0.031 inches. The cord diameters of a standard ply layer are typically in the range of about 0.022 to about 0.031. The ply layers in a tire may have different thicknesses. Alternatively, one or more of the ply layers may have a reduced cord spacing on the order of about 30% to about 100% of the epi spacing of a standard layer of ply. Alternatively, any or all of the ply layers in a tire 120,130,210,220 may be comprised of a reduced gauge ply having a reduced thickness on the order of about 30% to about 100% of the normal gauge thickness and a reduced cord spacing on the order of about 30% to about 100% of the epi spacing.

Figure 9A:
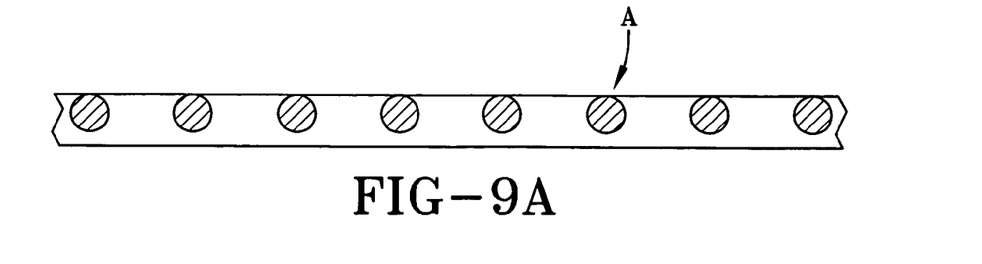
FIGS. 9A and 9B are a partial cross-sectional view of a first embodiment of a ply layer, and a first and second ply layer, respectively.
Figure 9B:
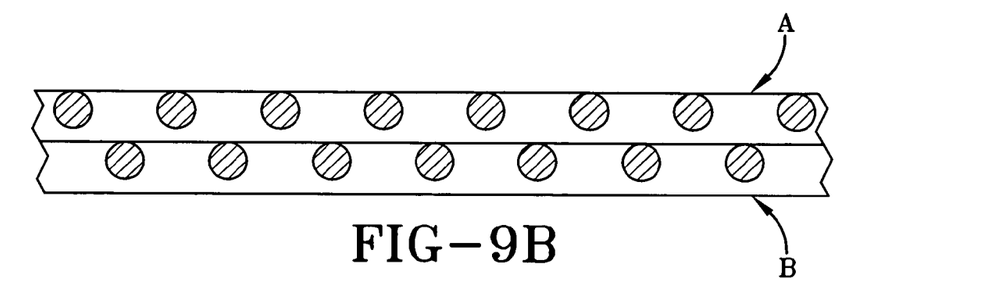

One example of a ply layer construction is shown in FIGS. 9a and 9b. The first layer and second layer of ply A, B may each have a gauge thickness in the range of about 30% to about 100% of standard ply gauge, and a cord spacing in the range of about 30% to about 100% the standard cord spacing. In one example, ply layers A,B may each comprise a gauge thickness of about 50% standard thickness and a reduced cord spacing of about 50% of the standard cord spacing. When layers A, B are combined together, the total thickness of both layers is about 100% of the standard thickness and a combined epi cord spacing of about 100% of the standard epi. However, ply layers A, B may each have different gauge thickness and cord spacing and when layered together, the combined total thickness may result in a nonstandard thickness and cord spacing.

As shown in FIG. 9B, the cords of ply layers A and B may be oriented at the top edge of the ply. The cords of the first layer of ply A may be offset from the cords of the second layer of ply B as shown in FIG. 9B. For example, when the two layers of ply are assembled together, they may have the thickness and cord spacing of a typical layer of ply.

Figure 10A:
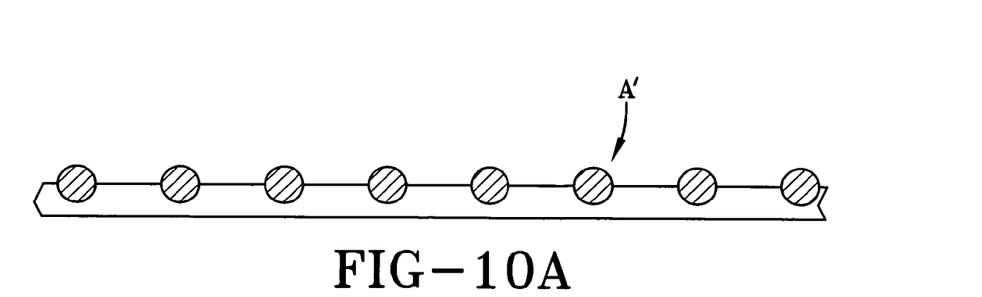
FIGS. 10A and 10B are a partial cross-sectional view of a second embodiment of a ply layer, and a first and second ply layer, respectively.
Figure 10B:
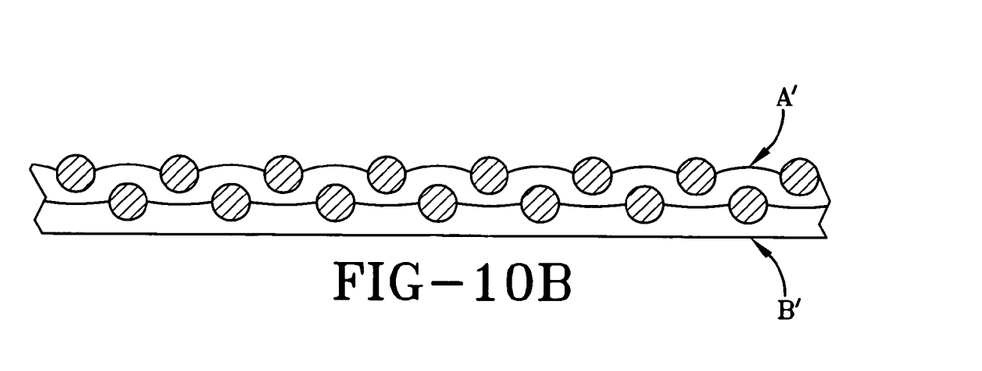

Alternatively as shown in FIGS. 10A and 10B, ply layers A', B' may have the cords projecting from the gum surface of the ply. The layers A'B' may be stacked on top of each other so that the gum or back edge of the first ply layer mates with the upper surface of the second ply layer as shown in FIG. 10B.

Figure 11A:
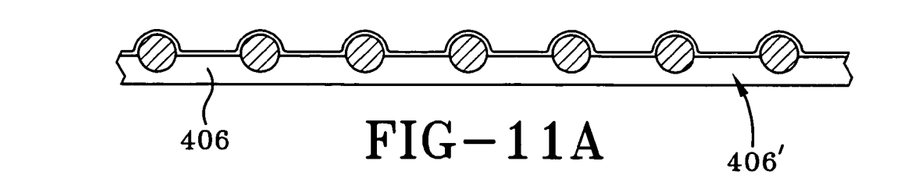
FIGS. 11A, 11B and 11C are partial cross-sectional views of a third embodiment of a ply layer.
Figure 11B:
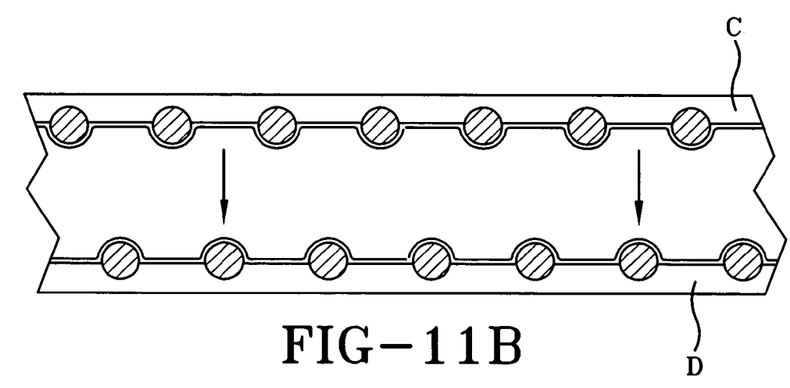
Figure 11C:
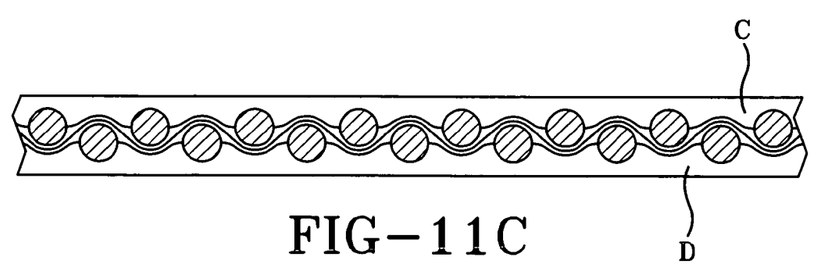

Alternatively as shown in FIGS. 11A-11C, ply layers may have a non-flush cord configuration coated with a skim coat of rubber. Ply layers C, D may be assembled such that the cords are abutted face to face wherein the cords of the C layer are located between the cords of the D layer, as shown in FIG. 11C.

Figure 12:
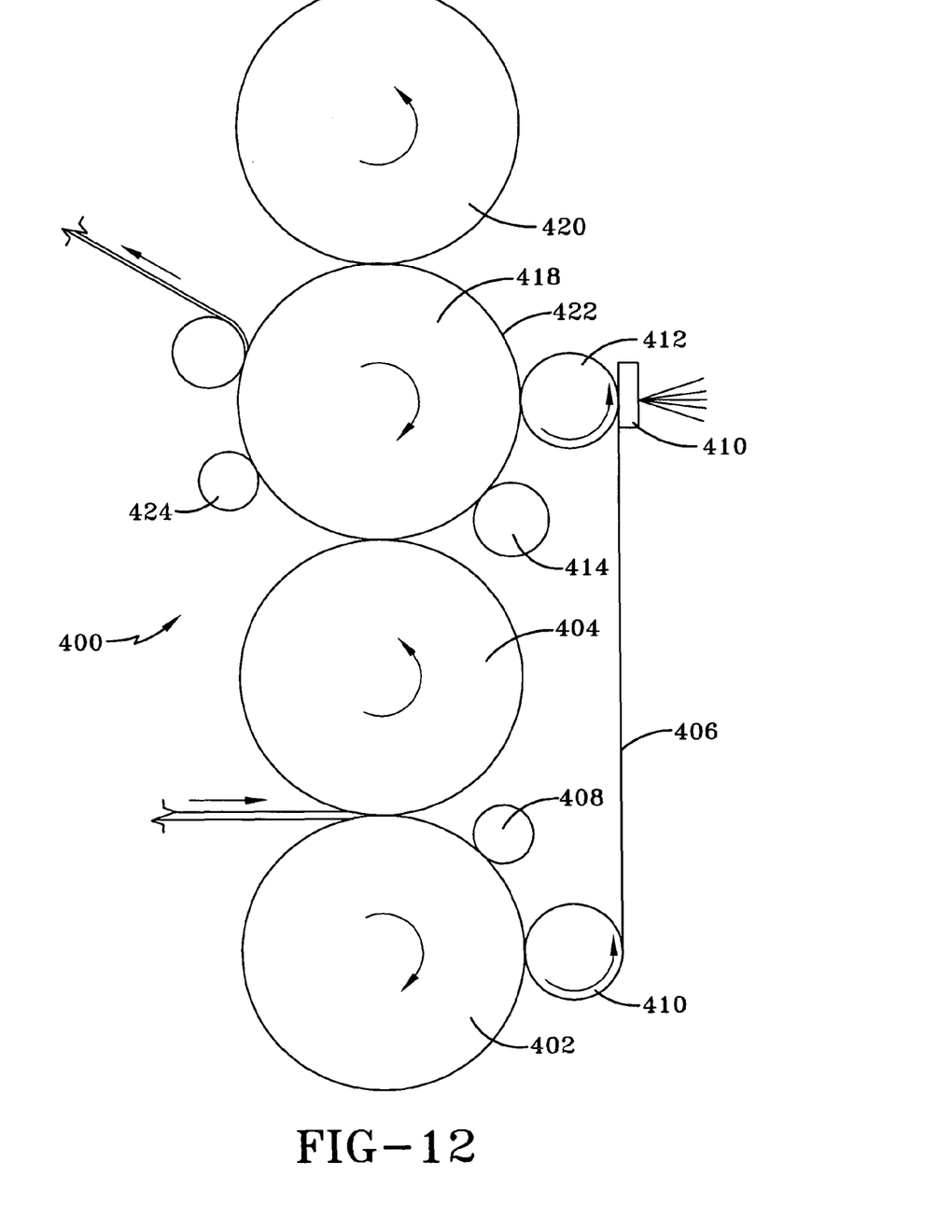
FIG. 12 is a side view of a calender system for forming ply.

The ply layers C, D may be formed from a calender system 400 as shown in FIG. 12. Rubber is fed to the nip of first calender roll 402 and a second calender roll 404 to form the base gum layer 406 of the ply. Trim knife 408 is used to trim off excess rubber to form the desired width of the base gum layer 406. Pull off roller 410 guides the base gum layer 406 and maintains the appropriate tension. The base gum layer 406 is fed to assembly roller 412 having an adjustable epi die 414 located in mating contact with the base gum layer 406. A plurality of cords is fed through the die inlet into engagement with the base gum layer mounted over the assembly roller 412. The die maintains the desired cord spacing. The cords are pressed into the top layer of the base ply by the pressure of the die against the assembly roller 412. An optional skim coat of rubber 422 may be applied as a top layer over the cords. Rubber is fed between two rollers 418,420 having a desired clearance gap to form the desired gauge of the rubber skim coat. The skim coat 422 is applied over the cord/gum layer wherein stitcher roller 414 stitches the skim layer onto the cord/gum layer. Trim knife 424 trims the formed ply to the desired width.

Figure 13:
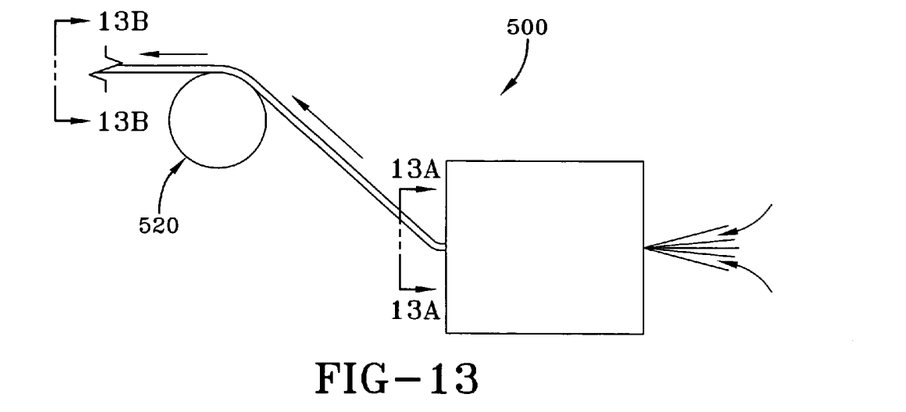
FIG. 13 is a side view of a cross feed extruder system having a die as shown in FIG. 13A for forming ply as shown in FIG. 13B.
Figure 13A:
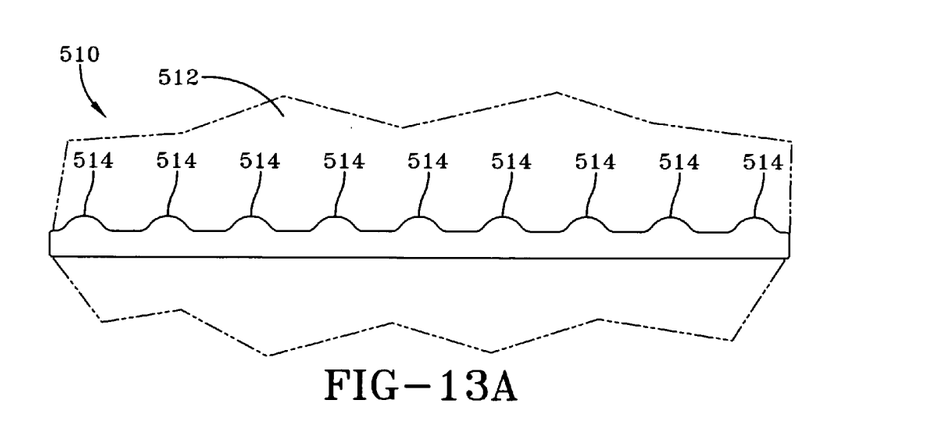
Figure 13B:
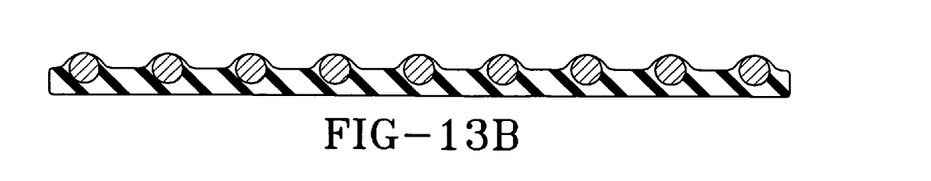

The ply layers shown in FIGS. 9-11 may also be formed from a cross-feed extruder system 500 shown in FIG. 13. As shown in FIG. 13b, a cross-feed extruder die 510 may be used having grooves 514 in the upper plate 512 of the die for receiving the cords therein. The grooves are spaced to match the desired cord epi spacing. The cords are pulled through the cross feed extruder by pull-up roller 520. As the cords are pulled through the cross feed extruder, they are coated with rubber.

While the present invention has been described with respect to certain specific examples, it will be apparent that many modifications and variations are possible without departing from the scope of the following claims.

What is claimed is:

1. A pneumatic tire comprising:
   a first and second axially-spaced bead core;
   a carcass having at least one belt extending under a tread, and a first ply layer having first and second ends, a first end is located axially outside and adjacent a first bead core but does not wrap around the first bead core, and a second end that is located axially outside and adjacent a second bead core but does not wrap around the second bead core;
   the carcass further comprising first and second shoulder ply layers, each shoulder ply layer having first and second ends, a first end is located under the tread belt, the shoulder ply extending down the side wall region with the second end folding from a position axially outside a respective bead core to a position axially inside and around the bead core, the carcass further comprising a reinforcement layer having a first end located radially outward of said bead cores, and a second end which extends to a position axially inside and around the bead core.

2. The tire of claim 1 wherein the reinforcement layer is positioned between the shoulder plies and the first ply layer.

3. The tire of claim 1 wherein the reinforcement layer is positioned outside of the shoulder plies.

4. The tire of claim 1 wherein the reinforcement layer is ply.

5. The tire of claim 1 wherein the reinforcement layer has a gauge thickness in the range of about 0.02 to about 0.06 mils.

6. The tire of claim 1 wherein the reinforcement layer has a cord spacing in the range of about 18 to about 36 epi.

7. The tire of claim 1 wherein the reinforcement layer has a cord spacing in the range of about 9 to about 29 epi.

* * * * *